No. 791,675. Patented June 6, 1905.

UNITED STATES PATENT OFFICE.

LOUIS DESCAMPS, OF LILLE, FRANCE.

PROCESS OF MAKING HYDROSULFITES.

SPECIFICATION forming part of Letters Patent No. 791,675, dated June 6, 1905.

Application filed July 6, 1903. Serial No. 164,444.

*To all whom it may concern:*

Be it known that I, LOUIS DESCAMPS, a citizen of the French Republic, and a resident of Lille, Nord, France, have invented certain new and useful Improvements in Processes of Making Hydrosulfites, of which the following is a full, clear, and exact specification.

My invention relates to improvements in the process of making hydrosulfites and to the product obtained therefrom.

The object of my invention is to provide a process by which the hydrosulfites may be economically produced on a commercial scale and by means of which may be produced a stable hydrosulfite—that is to say, a hydrosulfite which may be kept under ordinary conditions for a considerable length of time without decomposition.

My improved process consists in the quick addition of a reducing-powder—such as zinc, iron, tin, or the like—in a very fine and pure condition and in quantity slightly in excess of that theoretically required to a concentrated solution of sulfurous acid of industrial purity—that is, as free as possible from other acids and impurities. The solution may be an aqueous, alcoholic, glycerinous, or other solution of sulfurous acid. The mixture is stirred quickly, then allowed to deposit, and the solution finally decanted. It is of great importance that the whole of the sulfurous acid be transformed into hydrosulfite, and therefore the reducing-powder, such as zinc, must be in slight excess, as heretofore stated, for if even a single molecule of the acid should remain free a decomposition will take place. By thus instantaneously adding the whole quantity of the reducing-powder to the sulfurous acid the temperature of the liquid mass suddenly rises. I do not attempt to prevent by cooling this rising, which, if not excessive, is essential for instantaneously and completely succeeding with the reaction. This rapid action at an elevated temperature is of great importance, for the product is easily decomposed if the whole of the acid is not transformed. After having brought the reaction to an end I allow the slight undissolved excess of the reducing-powder and the impurities that might be present in spite of all precautions to deposit and decant the liquid. The zinc hydrosulfite thus obtained is ready to be used in reducing indigo or for other purposes, or the solution can be transformed into other hydrosulfites by addition of either bases, like lime, sodium hydrate, baryta, &c., or salts acting by double decomposition, such as acetate of calcium or of barium or the like.

The products obtained by my process are entirely stable and differ by this quality advantageously from the hydrosulfites prepared according to other processes. The economy of the reaction is sufficient, and the yield is almost theoretical. The degree of reduction of my hydrosulfites compared with those prepared according to other processes is very high. There are also no difficulties in obtaining by my process a pasty hydrosulfite of calcium, one and three-tenths (1.3) parts of which are sufficient to reduce one (1) part of pure indigo.

In practically carrying out my process I proceed, for instance, according to the following axample: Six hundred and seventy (670) grams of very pure zinc-dust are added at once—that is to say, at one charge—to one (1) kilogram of sulfurous acid in the form of an aqueous solution. The whole is quickly and intimately mixed and the solution decanted. The reaction takes place according to the following equation:

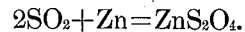

$$2SO_2 + Zn = ZnS_2O_4.$$

From the zinc-hydrosulfite solution thus obtained calcium hydrosulfite is readily obtained by adding to the said solution caustic lime or subjecting it to double decomposition by adding a salt of lime, such as the acetate of lime. This reaction proceeds in a manner well understood by chemists and results in a pure precipitate of the hydrosulfite of calcium, whose formula is $CaS_2O_4$. It precipitates in a pasty form, one and three-tenths of the same being sufficient to reduce one part of pure indigo.

The hydrosulfites produced by the process described and which have the general formula $MS_2O_4$ (where M denotes a bivalent metal) are especially applicable for the reduction of indigo, sulfur dyes, and other substances for decolorizing paper-pulp or sugar-juices, for the purification of water for antiseptic purposes, and the like.

Having thus fully described my invention, what I claim is—

1. The process of producing hydrosulfites of metals, which consists in quickly adding, in one charge, a reducing-powder of finely-divided metal slightly in excess of the theoretical amount, to a solution of sulfurous acid, and allowing the reaction to proceed without regulation of the temperature.

2. The process of producing hydrosulfites of metals which consists in quickly adding, in one charge, a reducing-powder of finely-divided metal slightly in excess of the theoretical amount, to a solution of sulfurous acid, then quickly stirring the mixture, allowing the reaction to proceed without regulation of the temperature, and, finally, decanting the solution.

3. The process of producing zinc hydrosulfite, which consists in quickly adding pure zinc, in a finely-divided condition, at one charge, and slightly in excess, to a concentrated solution of sulfurous acid, quickly stirring the mixture, allowing the reaction to proceed without regulation of the temperature, and, finally, decanting the solution.

4. The process which consists in quickly adding pure zinc in a finely-divided condition, at one charge and slightly in excess, to a concentrated solution of sulfurous acid, stirring the mixture and allowing the reaction to proceed without regulation of the temperature, then separating the solution and then adding a calcium compound to said solution.

5. The process which consists in quickly adding pure zinc in a finely-divided condition, at one charge and slightly in excess, to a concentrated solution of sulfurous acid, stirring the mixture and allowing the reaction to proceed without regulation of the temperature, then separating the solution and then adding caustic lime to said solution.

In testimony that I claim the foregoing as my invention I have signed my name in presence of two subscribing witnesses.

LOUIS DESCAMPS.

Witnesses:
JOSEPH HARDING,
HY GARVILLE.